United States Patent
Wurster et al.

(10) Patent No.: US 12,380,202 B2
(45) Date of Patent: Aug. 5, 2025

(54) METHODS AND SYSTEMS FOR MONITORING THE BEHAVIOR OF A PROCESS

(71) Applicant: BlackBerry Limited, Waterloo (CA)

(72) Inventors: Glenn Daniel Wurster, Kitchener (CA); Benjamin Gnahm, Augsburg (DE)

(73) Assignee: BlackBerry Limited, Waterloo (CA)

(*) Notice: Subject to any disclaimer, the term of this patent is extended or adjusted under 35 U.S.C. 154(b) by 290 days.

(21) Appl. No.: 17/739,249

(22) Filed: May 9, 2022

(65) Prior Publication Data

US 2023/0359725 A1    Nov. 9, 2023

(51) Int. Cl.
*G06F 21/52*    (2013.01)
*G06F 21/55*    (2013.01)

(52) U.S. Cl.
CPC ............ *G06F 21/52* (2013.01); *G06F 21/554* (2013.01); *G06F 2221/034* (2013.01)

(58) Field of Classification Search
CPC .................................................. H04L 63/0471
See application file for complete search history.

(56) References Cited

U.S. PATENT DOCUMENTS

| | | | | |
|---|---|---|---|---|
| 10,505,950 | B2* | 12/2019 | Sherkin ................ | H04L 12/403 |
| 10,637,142 | B1* | 4/2020 | Tran ..................... | H04W 4/44 |
| 10,778,663 | B2* | 9/2020 | Rothschild ............ | H04L 63/10 |
| 10,936,191 | B1* | 3/2021 | Lakshminarayanan ..................... G06F 3/067 | |
| 11,082,211 | B2* | 8/2021 | McCarthy ............. | H04L 9/0662 |
| 11,271,947 | B2* | 3/2022 | Kuruvilla ............ | H04L 63/0428 |
| 11,314,859 | B1* | 4/2022 | Singh ................... | G06F 21/554 |
| 11,438,159 | B2* | 9/2022 | Sandoval ............. | H04L 9/3213 |
| 11,438,328 | B2* | 9/2022 | Dachev .............. | H04L 63/0846 |
| 11,741,256 | B2* | 8/2023 | Gupta ................. | G06F 21/552 726/23 |
| 11,750,527 | B2* | 9/2023 | Singleton, IV ....... | H04L 9/3213 709/226 |
| 11,803,929 | B1* | 10/2023 | Kapczynski ......... | G06Q 50/265 |
| 11,838,410 | B1* | 12/2023 | Ramanathan ......... | H04L 9/0861 |
| 11,861,603 | B2* | 1/2024 | Bailey ................... | G06F 21/60 |
| 11,876,789 | B2* | 1/2024 | Van Adrichem ........ | H04L 9/002 |

(Continued)

OTHER PUBLICATIONS

Extended European Search Report, EP23172044.2 Oct. 2, 2023.

(Continued)

*Primary Examiner* — Viral S Lakhia
(74) *Attorney, Agent, or Firm* — Conley Rose, P.C.; J. Robert Brown, Jr.

(57) ABSTRACT

Methods and systems for monitoring the behavior of a process. A profile of a software module is obtained. An association request is received from a process. The association request includes an identifier. In response to receiving the association request, successfully validating the identifier based on the profile and establishing an association of a token to data associated with the identifier. A disassociation request is received from the process. The disassociation request includes a token. In response to receiving the disassociation request, using the token to retrieve the data associated with the identifier, determining that the disassociation request is invalid based on the profile and the data associated with the identifier, and based on the determination that the disassociation request is invalid, taking an action.

18 Claims, 7 Drawing Sheets

(56) References Cited

U.S. PATENT DOCUMENTS

| | | | |
|---|---|---|---|
| 11,954,238 B1* | 4/2024 | Tan | H04L 9/0891 |
| 12,020,051 B2* | 6/2024 | Hayatnagarkar | G06F 9/546 |
| 12,248,560 B2* | 3/2025 | Ionescu | G06F 12/1441 |
| 2014/0040979 A1* | 2/2014 | Barton | H04W 12/30 |
| | | | 726/1 |
| 2015/0113640 A1 | 4/2015 | Krten et al. | |
| 2017/0093844 A1* | 3/2017 | Chambliss | G06F 21/10 |
| 2019/0180036 A1 | 6/2019 | Shukla | |
| 2020/0364331 A1* | 11/2020 | Villatel | G06F 21/566 |
| 2021/0409223 A1* | 12/2021 | Subramanian | H04L 9/3213 |
| 2022/0020013 A1* | 1/2022 | Bailey | G06Q 20/3823 |
| 2022/0303267 A1* | 9/2022 | D'Agostino | H04L 63/0876 |
| 2022/0311753 A1* | 9/2022 | Van Adrichem | H04L 9/302 |
| 2022/0350734 A1* | 11/2022 | Coutinho Moraes | |
| | | | G06F 11/302 |
| 2023/0162236 A1* | 5/2023 | Abu Elreich | G06Q 20/387 |
| | | | 705/14.11 |
| 2023/0342455 A1* | 10/2023 | Yarabolu | G06F 21/554 |
| 2024/0089087 A1* | 3/2024 | Ragan | H04L 9/0819 |

OTHER PUBLICATIONS

Claudio Canella et al., "SFIP Course-Grained Syscall-Flow-Integrity Protection in Modern Systems". arxiv.org, Cornell University Library, 201 Olin Library Cornell University Ithaca, NY 14853 Feb. 28, 2022.

* cited by examiner

METHODS AND SYSTEMS FOR MONITORING THE BEHAVIOR OF A PROCESS

FIELD

The present application generally relates to software processes and, more particularly, to monitoring the behavior of a process.

BACKGROUND

Software programs may have vulnerabilities that can be exploited by attackers. When exploiting a vulnerability, an attacker may abort a running program's normal flow and instead run, within the process associated with that program, a program provided by the attacker.

The ability to detect the transition of the execution of a first program (i.e. the original program before being exploited) to a second program (i.e. the exploit or attacker provided program) within the same process and using the same address space can be important. One way of detecting exploits and preventing a process from running two different programs is to use control-flow integrity (CFI). CFI verifies that the control flow of a program does not deviate from the control flow paths in the software program when it was built. Unfortunately, although CFI techniques can be used to verify the control flow of a binary program, these techniques may not be helpful for interpreted languages because it is the interpreter that would be subject to the CFI and the interpreted program itself may have its control flow subverted. Other techniques, using sequences of system calls, may also detect when the behavior of a program changes.

Various other mechanisms for securing computer systems exist. Some of these mechanisms involve applying access control policies that may vary during runtime of a software program. An example is Security-Enhanced Linux™ (SE-Linux™), which provides a mechanism for supporting access control policies and associated type transitions. Another example is the secure computing mode ("seccomp") facility in the Linux™ kernel, which provides a means for a process to filter system calls. With SELinux™ and seccomp, access control policy changes are a direct result of a process running the software program requesting a change in the policy.

It would be advantageous to provide for enhanced robustness of systems and methods for monitoring a process for unexpected behavior.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
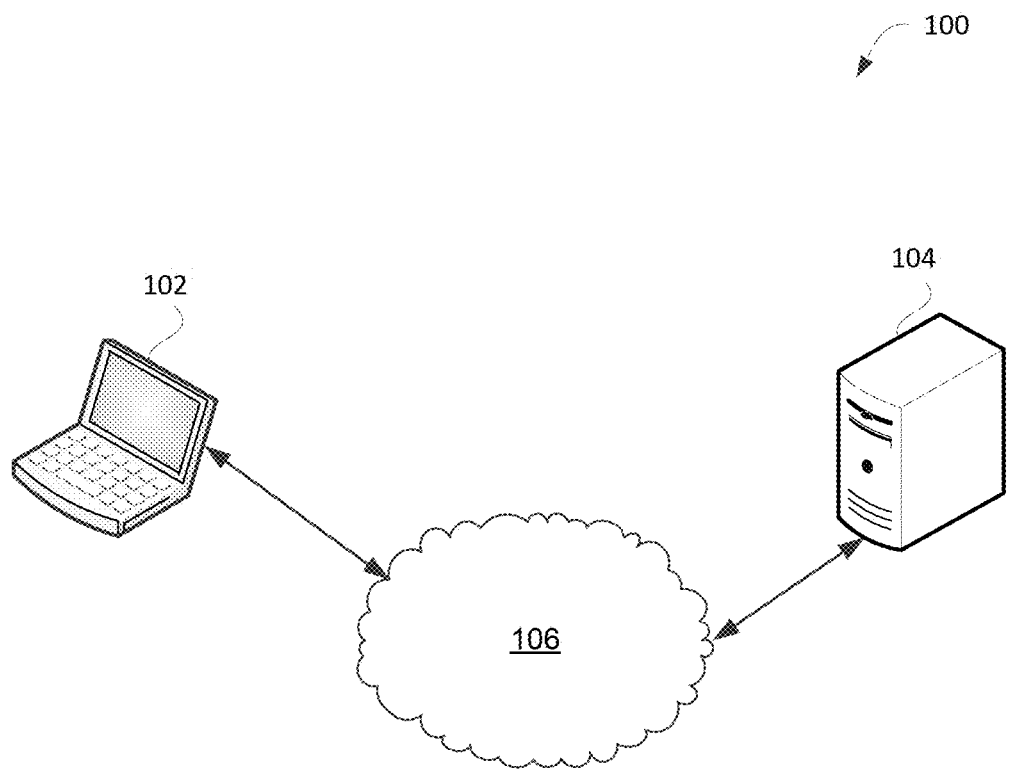
FIG. 1 shows a schematic diagram illustrating an operating environment of an example embodiment.

In a first aspect, the present application describes a computer-implemented method of monitoring the behavior of a process. The method may include obtaining a profile of a software module and receiving, from a process, an association request including an identifier; in response to receiving the association request: successfully validating the identifier based on the profile; and establishing an association of a token with data associated with the identifier; receiving, from the process, a disassociation request including the token; and in response to receiving the disassociation request: retrieving, based on the token, the data associated with the identifier; determining, based on the profile and the data associated with the identifier, that the disassociation request is invalid; and based on the determination that the disassociation request is invalid, taking an action. In some implementations, the operation of retrieving, based on the token, the data associated with the identifier may fail and, in response to that failure, determine that the disassociation request is invalid.

In some implementations, establishing the association of the token with data associated with the identifier may include establishing an association of a token with the identifier. The data associated with the identifier may be or include the identifier, or include data that maps to the identifier.

In some implementations, the token may include a logical address.

In some implementations, the profile of the software module may be or include a profile of a script.

In some implementations, the association request may correspond to a system call and/or the disassociation request may correspond to a different system call.

In some implementations, the method may further include, in response to receiving a second association request, the second association request including the identifier, determining that the second association request is invalid based on the identifier and the profile.

In some implementations, the method may further include, in response to the association request, transitioning, based on the profile and the identifier, a policy applied to the process.

In some implementations, the method may further include, in response to receiving a second disassociation request, the second disassociation request including a second token, determining that the second token does not correspond to any key included in the profile, and/or determining that the second token does not correspond to any trigger event defined in the profile.

In some implementations, the method may further include, in response to receiving a second disassociation request, the second disassociation request including a second token: retrieving, based on the second token, data associated with a second identifier; determining, based on the profile and the data associated with the second identifier, that the second disassociation request is valid; disassociating the token from the data associated with the second identifier, which may include disassociating the token from the second identifier or disassociating the token from a key that may be mapped to the identifier; detecting a trigger event based on the data associated with the second identifier, which may be or map to the key; and triggering a transition from a first state to a second state.

In some implementations, the association request may further include the token.

In another aspect, there may be provided a system for monitoring the behavior of a process. The system may include a processor and a memory coupled to the processor. The memory may store processor executable instructions that, when executed by the processor, cause the processor to: obtain a profile of a software module; receive, from a process, an association request including an identifier; in response to receiving the association request: successfully validate the identifier based on the profile; and establish an association of a token with data associated with the identifier; receive, from the process, a disassociation request including the token; and in response to receiving the disassociation request: retrieve, based on the token, the data associated with the identifier; determine, based on the profile and the data associated with the identifier, that the disassociation request is invalid; and based on the determination that the disassociation request is invalid, taking an action.

In some embodiments, the processor may be further configured to, in response to receiving a second association request, the second association request including the identifier, determine that the second association request is invalid based on the identifier and the profile.

In some embodiments, the processor may be further configured to, in response to the association request, transition, based on the profile and the identifier, a policy applied to the process.

In some embodiments, the processor may be further configured to, in response to receiving a second disassociation request, the second disassociation request including a second token, determine that the second token does not correspond to any key included in the profile.

In some embodiments, the processor may be further configured to, in response to receiving a second disassociation request, the second disassociation request including a second token: retrieve, based on the second token, data associated with a second identifier; determine, based on the profile and the data associated with the second identifier, that the second disassociation request is valid; and trigger a transition from a first state to a second state.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference will now be made to FIG. 1, which diagrammatically illustrates an example system 100 in which methods and devices in accordance with the present description may be implemented. The system 100 in this example includes a client device 102 and a remote server 104.

Although the client device 102 and remote server 104 are depicted as being implemented by particular devices such as a laptop computer and a desktop computer, it will be understood that the client device 102 and remote server 104 may be implemented by one or more computing devices, including servers, personal computers, tablets, smartphones, Internet of Things (IoT) devices, or any other type of computing device that may be configured to store data and software instructions and execute software instructions to perform operations consistent with disclosed embodiments.

The system 100 further includes a network 106. The network 106 allows for communication between the client device 102 and the remote server 104.

The client device 102 may be configured to automatically install a software module obtained from the remote server 104. The client device 102 may also obtain from the remote server 104 data associated with the software module, including a profile of an expected behavior of the software module. The client device 102 may use the profile to verify that the behavior of the process executing the software module does not deviate from the expected behavior of the software module.

The client device 102 may be configured to automatically collect and transmit data to the remote server 104. The client device 102 may include a monitoring agent configured to continuously monitor the behavior of a process executing the software module and transmit notifications. In particular, the client device 102 may transmit information regarding the behavior of a process to the remote server 104 for storage, processing, analysis and/or monitoring of the client device 102 by the remote server 104.

The remote server 104 may be configured to receive and respond to communications from the client device 102. The remote server 104 may be further configured to manage and/or control the client device 102. For example, the remote server 104 may communicate commands or notifications to the client device 102. In some embodiments, the remote server 104 may include multiple computing devices such as, for example, database servers, Hypertext Transfer Protocol (HTTP) servers, and the like. More generally, the remote server 104 may include infrastructure that controls the client device 102 and/or collects data from the client device 102.

The remote server 104 may be further configured to ingest and aggregate data received from the client device 102. The remote server 104 may also be configured to generate a profile of the software module and transmit the profile to the client device 102. A profile may be generated using dynamic program analysis or static code analysis and may be in a human-readable format or in a binary format. In some embodiments, the profile may capture the ongoing interaction of a process, executing the software module, with its address space via a memory management module.

Figure 2:
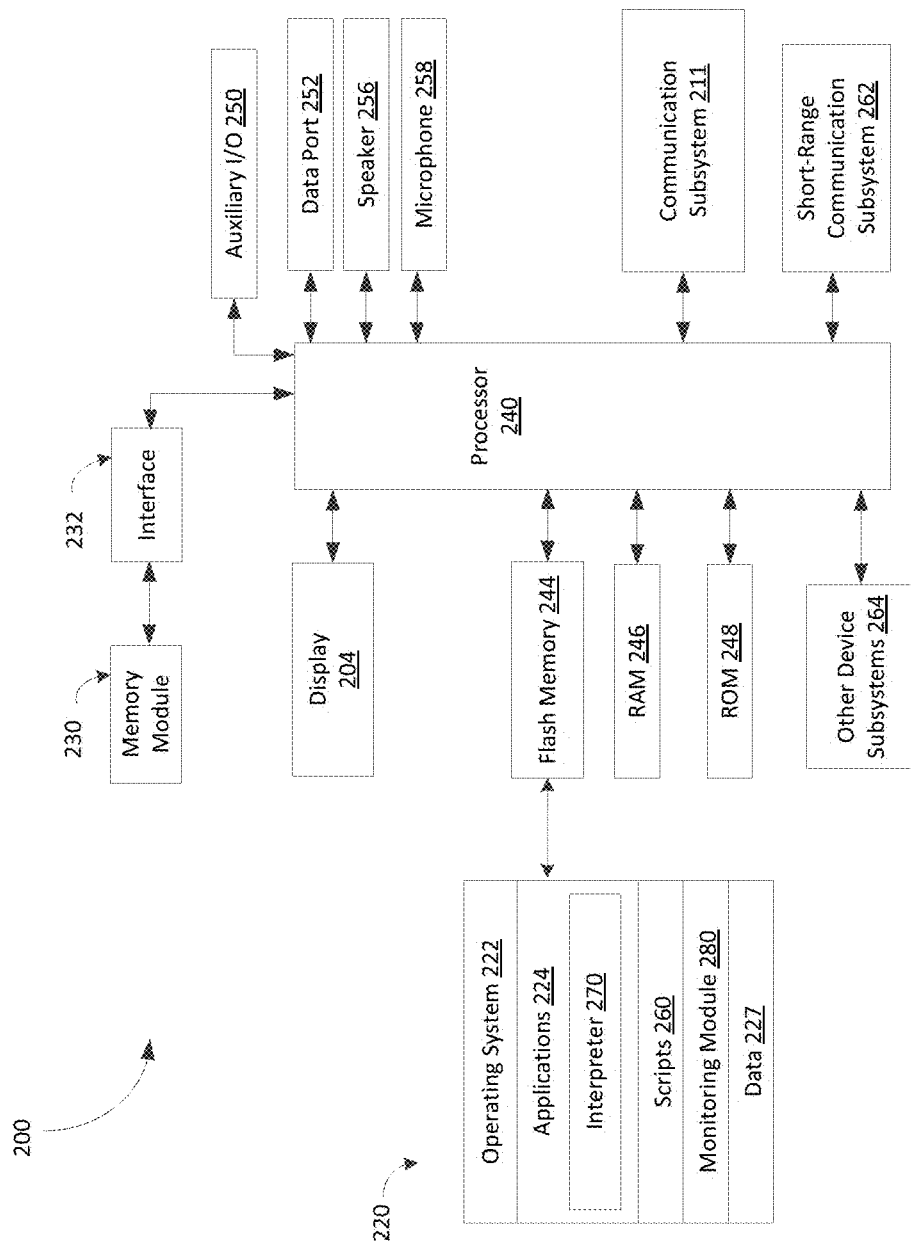
FIG. 2 is a block diagram illustrating components of example embodiments of the computing devices of FIG. 1.

Reference is made to FIG. 2, which illustrates a block diagram of an example embodiment of each particular computing device of FIG. 1, namely the client devices 102 and the remote server 104. In an example embodiment, the computing device 200 of FIG. 2 may be configured for two-way communication, having data and optionally voice communication capabilities, and the capability to communicate with other computer systems, e.g. via the internet. In some embodiments, the computing device 200 may take other forms, such as smartwatches, computers, tablets, laptops, or any other electronic device configured for connection over wireless networks.

The computing device 200 of FIG. 2 may include a housing (not shown) which houses components of the computing device 200. Internal components of the computing device 200 may be constructed on a printed circuit board (PCB). The computing device 200 includes a controller including at least one processor 240 (such as a microprocessor) which controls the overall operation of the computing device 200. The processor 240 interacts with device subsystems, such as a wireless communication subsystem 211, for exchanging radio frequency signals with a wireless network to perform communication functions. The processor 240 interacts with additional device subsystems including one or more input interfaces (which may include, without limitation, any of the following: a keyboard, one or more control buttons, one or more microphones 258, a gesture sensor, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces (such as a display 204), one or more speakers 256, or other output interfaces), a short-range communication subsystem 262, and other device subsystems generally designated as 264.

In some example embodiments, the auxiliary input/output (I/O) subsystems 250 may include an external communication link or interface, for example, an Ethernet connection. The communication subsystem 211 may include other wireless communication interfaces for communicating with other types of wireless networks, e.g. Cellular, WLAN, WPAN, Bluetooth®, ZigBee®, Near Field Communications (NFC), and Radio Frequency Identification (RFID).

In some example embodiments, the computing device 200 also includes a removable memory module 230 (typically including flash memory) and a memory module interface 232. Network access may be associated with a subscriber or user of the computing device 200 via the memory module 230, which may be a Subscriber Identity Module (SIM) card for use in a cellular network (e.g., Global System for Mobile Communications (GSM), Universal Mobile Telecommunications Service (UMTS), Long-Term Evolution (LTE) or 5G) or other type of memory module for use in the relevant wireless network type. The memory module 230 may be inserted in or connected to the memory module interface 232 of the computing device 200.

The computing device 200 may store data 227 in an erasable persistent memory, which in one example embodiment is the flash memory 244. In some example embodiments, the data 227 may include service data having information required by the computing device 200 to establish and maintain communication with a wireless network. The data 227 may also include user application data such as messages (e.g. emails, texts, multimedia messages, etc.), address book and contact information, calendar and schedule information, notepad documents, image files, and other commonly stored user information stored on the computing device 200 by its users, and other data.

The data 227 stored in the persistent memory (e.g. flash memory 244) of the computing device 200 may be organized, at least partially, into a number of databases or data stores each containing data items of the same data type or associated with the same application. For example, profiles and policies may be stored in individual files within the computing device 200 memory.

The short-range communication subsystem 262 provides for communication between the computing device 200 and different systems or devices, which need not necessarily be similar devices. For example, the short-range communication subsystem 262 may include an infrared device and associated circuits and components, a wireless bus protocol compliant communication mechanism such as a Bluetooth® communication module to provide for communication with similarly-enabled systems and devices, and/or a near-field communication (NFC) interface.

A set of applications that control basic device operations, including data and possibly voice communication applications, may be installed on the computing device 200 during or after manufacture. Additional applications and/or upgrades to an operating system 222 or software applications 224 may also be loaded onto the computing device 200 through the wireless network, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory, e.g. in the flash memory 244. As illustrated in FIG. 2, the software modules 220 may include an operating system 222, one or more software applications 224 and one or more scripts 260. The software modules 220 may be off-the-shelf or custom-built. A software module may be a binary program or may be in a human-readable format, for example, a program written in a scripting language. Specific examples of scripting languages include the JavaScript™ programming language and the Python™ scripting language. A scripting language may be a just-in-time (JIT) compiled language, where the source code (i.e. the script) is compiled during execution of the script (at runtime) rather than prior to execution.

The software modules 220 may be configured to invoke function or system calls. An example of a function call is a request for the allocation of memory to a requesting process or the release of memory allocated to the process. Using the example of the C programming language, a library call such as "malloc" may be used to dynamically allocate an area of memory on the heap to the process at runtime. Although "malloc" is not a system call, it may invoke a system call in order to have more memory allocated to the process. The library call may return a virtual memory address of a location of heap memory. A library call such as "free" may be used to release memory that is allocated using "malloc".

A specific example of an application that may be resident on the computing device 200 includes an interpreter 270. The interpreter 270 may directly execute a software module written in a programming language or scripting language, without requiring the software module to have been compiled into a binary program prior to execution. The interpreter may, for example, execute a software module by parsing the source code and performing the operations of the source code directly, or by translating the source code into another format and executing that.

The software modules 220 may also include a monitoring module 280 that may, when executed, provide a monitoring service that may be engaged in order to monitor a behavior of a process and determine whether the behavior deviates from a profile of a software module. In some embodiments, the monitoring module 280 may be or include the operating system 222, a kernel, a kernel module, or a software application 224. Specific examples of applications that may include the monitoring module 280 include a monitoring agent and/or reporting agent. The monitoring module 280 may operate partly under control of a remote server for the purpose of carrying out the monitoring.

The operating system software 222 may provide a file system for storing, modifying and accessing files held in the persistent memory (e.g. flash memory 244) of the computing device 200. This file system may be accessible to other programs running on the processor 240 via a programmatic interface provided by the operating system software 222. Specific examples of operating system software 222 include the Android™ operating system and the Windows™ operating system. The operating system software 222 may be proprietary or non-proprietary. The operating system may support one or more system calls. A system call may be a request made by a process running in user space and received by the kernel of the operating system. A system call may be regarding a service provided by the operating system and may be for the operating system to perform a hardware action on behalf of the process. A process may refer to a running instance of a software module.

Types of system calls supported by the operating system software 22 may include memory management, information management, file management and communication system calls. A memory management system call may include a request to map memory or to release memory. An information management system call may include a request for the time, date, or information about the operating system processes. A communication system call may include an inter-process communication system call for passing a message from one process to another process or for creating or gaining access to regions of memory owned by another process.

The operating system may maintain a table that maps virtual addresses to physical addresses, which may be used when a request is made to read or write to a memory address. A physical address may identify a region of physical memory, which in one example embodiment may be the RAM 246. The virtual memory that is available to a process may be referred to as the process's address space. A process's address space may be organized into various sections, including a "stack" section where regions of memory are used to store data in a last-in-first-out manner and a "heap" that may be used for dynamic allocation of memory.

Figure 3:
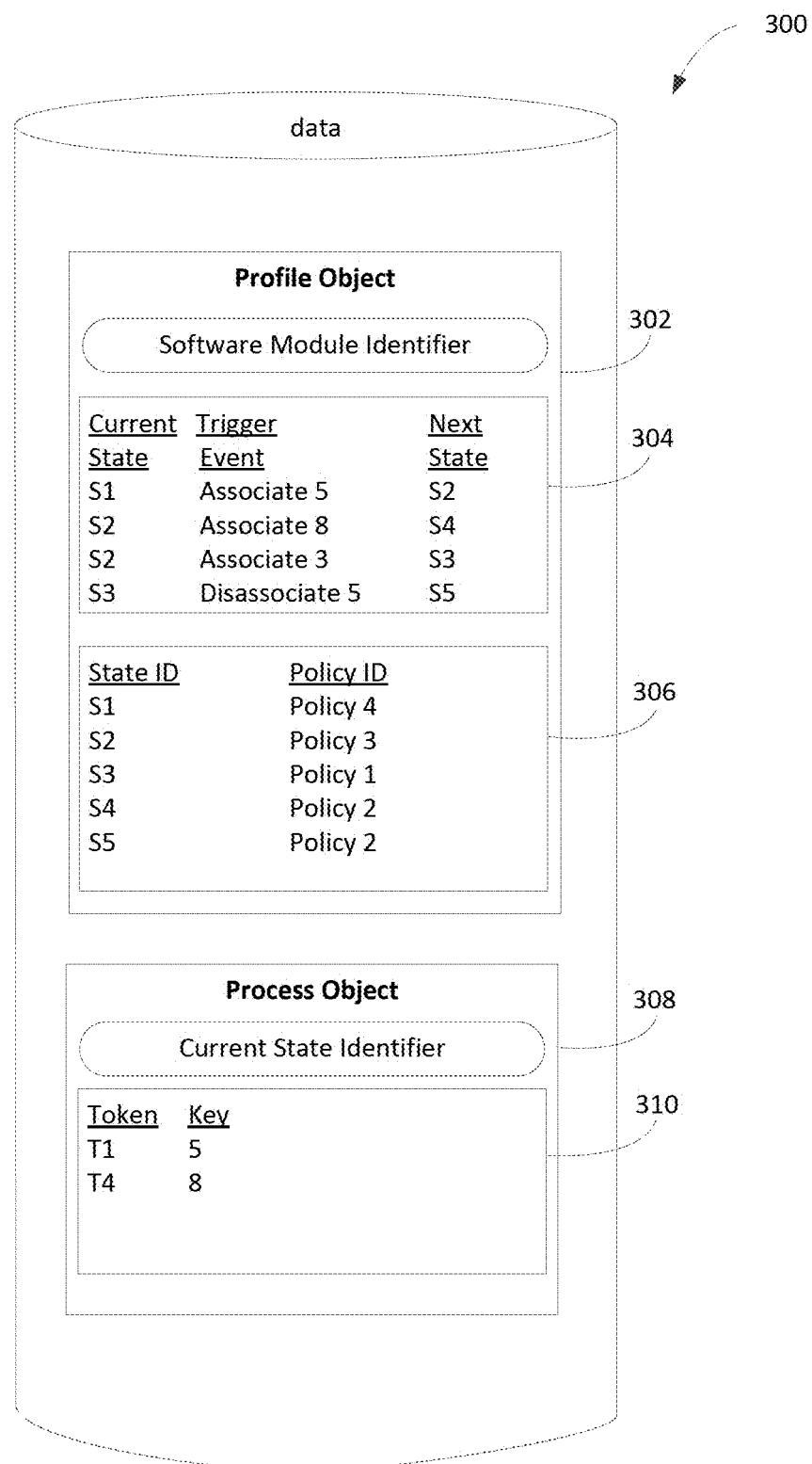
FIG. 3 diagrammatically shows an example of profile and process data.

Reference is now made to FIG. 3, which partially illustrates an example data facility 300 of a computing device. The data facility 300 may be, for example, a flash memory 244 of the example computing device 200 of FIG. 2 or a data facility external the computing device. The computing device may be the client device 102 of the example system 100 of FIG. 1. Not all components of the data facility 300 are illustrated.

The data facility 300 may store data regarding a profile in a profile object 302. The profile object 302 may be a data structure and may include an event-based profile of a software module. The profiled software module may be or include a software application or script. The profile may represent the behavior of the software module and may specify the states that a process may be associated with during its lifetime in response to events initiated by the software module. A profile may include details of a plurality of states associated with a running software module. Example details include state transition information and access control policies associated with the states.

Various techniques and data structures may be implemented to manage and store the profile. In some embodiments, the profile object 302 includes a state-transition table 304. The state-transition table 304 may include details of a state transition in separate columns. A first column may correspond to current states, a second column may correspond to trigger events, and a third column may correspond to next states. Each row of the state-transition table 304 may include details of a transition from a current state to a next state in response to an event. Example details of a state transition may include: a current state; event; and next state. An event that initiates a transition from one state to another may be referred to as a trigger event or trigger.

An event may correspond to one or more operations. An operation may be or include a system call, function call, or other request received from a process or other execution environment of a software module. The event may include details of an operation. Example details include an indication of a type of request and a parameter included in the request. An example of a type of request includes a memory management request to allocate memory or to release memory. Another example of a type of request includes a state management request to associate a token to a key to a monitored and requesting process or to disassociate a key-token association that is allocated to the process.

An event may correspond to a combination of a type of request and a key. The combination may be represented by a string, such as, for example, "Associate 5", which may represent a space separated tuple including a request type and a key or identifier. The request type may correspond to a requested operation. For example, the request type "Associate" shown in the state-transition table 304 may refer to a request to associate a key with a token in the requesting process' associations object 310. The request type "Disassociate 5" shown the state-transition table 304 may refer to a request to disassociate a key with a token in the process object 310. The key "5", for example, may be associated with the token "T1" provided as a parameter included in a disassociate request.

An identifier may refer to or include a data structure, numeric value or other information. In some cases, an identifier may indicate or correspond to a location in the software module associated with the profile. The location may be in the source code of the software module and may be identified using, for example, a file name, method name, and/or line number. The source code may be transformed by an assembler or compiler into machine code that may be executed by the process or, in the case of a script, may be interpreted and executed without having been compiled.

A key may refer to or include a data structure, numeric value, or other information. In some implementations, the identifier and key are of the same type. In other implementations, the identifier is mapped to a key. A key, as well as the profile including the key, may remain static and unchanged during the execution of the software module.

The events listed in the state-transition table 304 include both a request type and key. However, in some embodiments, the key may be included in a separate column and referred to as a guard condition. A guard condition may be a condition that must be satisfied for a transition to occur. In this case, the condition may be that the event corresponds to or is associated with the key.

The current state and the next state in the state-transition table 304 may be indicated using a state identifier, for example, the string "S1". In some embodiments, the state identifier may be a set of keys that have been allocated to a process.

The profile object 302 may also include a state object 306 that stores a mapping of a state identifier to an associated policy identifier. A state identifier may be #-used to lookup a policy that is to be applied to the process upon transition into the next state. The policy identifier may identify a particular policy. A policy may refer to a data structure or other information that includes a set of preferences, rules, conditions or other criteria for defining the behavior of operations for controlling access to resources. By way of example, a policy may allow a process to bind to network. The same policy may be associated with more than one state.

The profile object 302 may also include a software module identifier, which may identify a software module corresponding to the profile object 302.

The data facility 300 may store data regarding a process in a process object 308. The process object 308 may include an identifier of a current state associated with the process. The current state should identify a state that is included in the state-transition table 304. The process object 308 may also include an allocated associations object 310 that may store data regarding the associations of a token to a key. The allocated associations object 310 may be a data structure and may include a list or set of keys and one or more respective tokens that correspond to each particular key in the set of keys. A token may be used to lookup a key in the set of keys.

Figure 4:
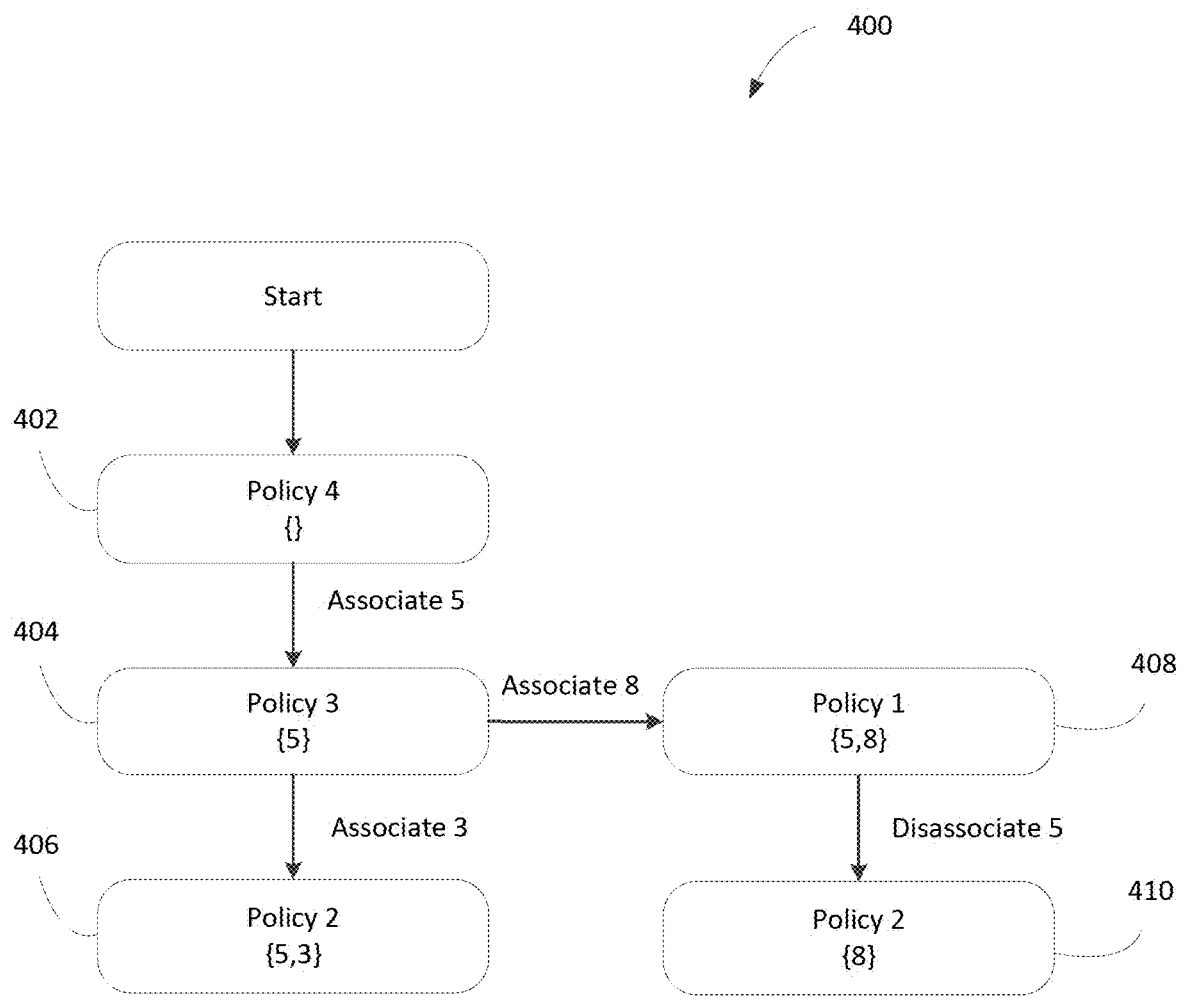
FIG. 4 shows an example of a state transition diagram representing the states and transitions in the profile data of FIG. 3.

Reference is now made to FIG. 4 which diagrammatically shows an example profile in the form of an example state transition diagram 400. The example state transition diagram 400 may be an alternative representation of the profile object 302 of the data facility 300 of FIG. 3.

The state transition diagram 400 describes a profile of an expected behavior of a running software module. In other words, the state transition diagram 400 describes an expected behavior profile of a process executing the software module.

As shown, the state transition diagram 400 includes a set of states 402, 404, 406, 408 and 410. The edges connecting the set of states 402, 404, 406, 408 and 410 are represented by arrows that show the transition from one state to another. Each arrow is labelled with the particular event or condition that triggers that transition. Each particular state in the set of states 402, 404, 406, 408 and 410 is labelled with an identifier of a policy applied to the process and is also labelled with the set of keys associated with the process when in the respective state. Although not shown in the example state transition diagram 400, some example state transition diagrams may indicate transitions causing a same state or a transition to a particular state from the particular state.

The state associated with the monitored process transitions in response to a trigger event. For example, the initial state 402 may be entered when execution of the software module commences. In this initial state 402, a policy "Policy 4" and no key associations or an empty set of key associations may be associated with the process. The monitored process then transmits an "Associate" request including an identifier which is mapped to key "5" and token (not shown) to a monitoring service. A monitoring service receives the request and determines that a condition "Associate 5" for transitioning to the next state 404 has been satisfied. This triggers the monitoring service to initiate a state transition and apply a different policy "Policy 3" and associate the key "5" with the given token in the associations for the process. The monitored process then transmits an "Associate" request including the identifier which is mapped to key "3" or "8" to the monitoring service along with a token (not shown). If an association request for the key "3" is transmitted, then a transition is made to the next state 406 in which yet another different policy "Policy 2" is applied to the monitored process and the key "3" is associated with the provided token (not shown) for the monitored process. Alternatively, if a request involving the key "8" is transmitted, then a transition is made to the next state 408 in which yet another different policy "Policy 1" is applied to the monitored process and the key "8" is added along with the provided token (not shown) to a set of associations for the monitored process. In the latter case, if the process then transmits a "Disassociate" request containing a token associated with key "5", then the transition to the next state 410 is triggered and yet another different policy "Policy 2" is applied to the monitored process and the association of key "5" with the token (not shown) is removed from the set of associations for the monitored process.

However, if the process transmits a request that is not allowable in the current state, for example the process transmits an "Associate" request including an identifier which maps to key "7" or a "Disassociate" request including a token associated with the key "7", then this is an indication that the process has deviated from the expected behavior and, accordingly, an alert may be raised or other action taken. Similarly, if a process transmits a "Disassociate" request including a token not associated with any keys, it is an indication that the process has deviated from expected behavior and, accordingly, an alert may be raised or other action taken.

Figure 5:
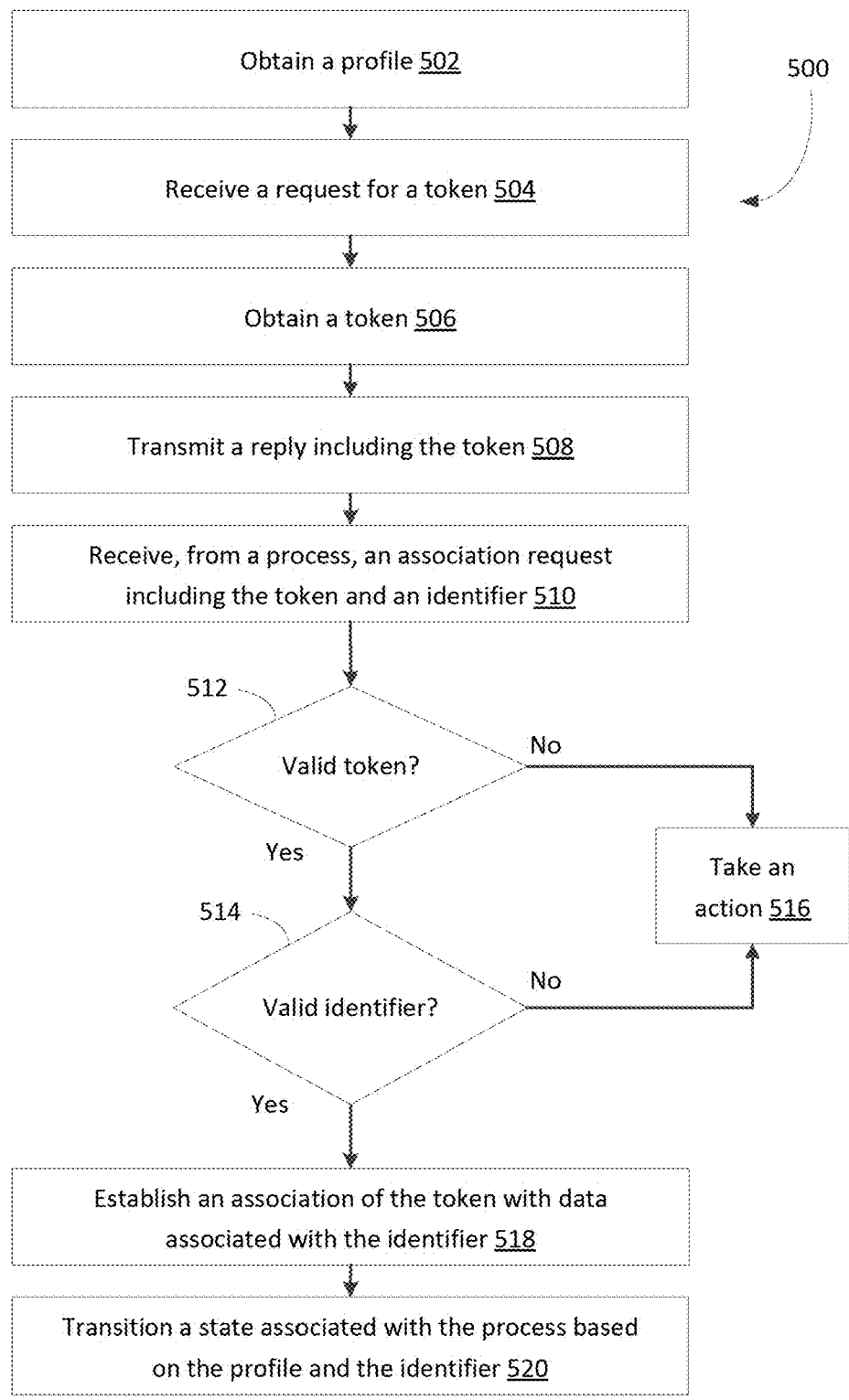
FIG. 5 shows a flowchart of a simplified example method of monitoring the behavior of a process.

Reference will now be made to FIG. 5, which shows, in flowchart form, a simplified example of a method 500 of monitoring a process during the "Associate" phase. The example method 500 may be implemented, at least in part, by one or more computing devices and/or monitoring modules suitably programmed to carry out the functions described. The computing device may be implemented by the client device 102 in the example system 100 described in FIG. 1 and the monitoring module may be implemented by the monitoring module 280 in the example computing device 200 described in FIG. 2. In some implementations, the method 500 is implemented on the computing device hosting the monitored process and results are reported to a remote server separate from the computing device.

In some implementations, aspects of operations 502, 504, and 506 may be performed by the monitored process or outside of the monitored process. The operations 508, 510, 512, 514, 516, 518, and 520 the method 500 of FIG. 5 should be performed outside of the monitored process and its address space, for example, by the kernel and/or by a separate process. In this way, a set of associations allocated to the monitored process may not be directly accessible to an attacker's program being executed by the monitored process.

The method 500 includes an operation 502 in which a profile of a software module is obtained. The profile may be retrieved, for example, from a remote server or from the example data facility 300 of FIG. 3.

In operation 504, a request for a token is received. In some embodiments, the request is received from a monitored process. The monitored process may be a process that is executing the software module associated with the profile and/or executed that software module prior to executing an attacker's program.

In some embodiments, the request is also for dynamically allocating memory. Using the example of the C programming language, the request may correspond to the process invoking the library function "malloc" that is used to allocate a block of memory from the "free store" area of memory, also known as the "heap".

In operation 506, the token is obtained. In some embodiments, obtaining the token includes generating a random value to be used as the token. The random value may be generated using, for example, a pseudorandom number generator (PRNG), or a hardware random number generator (HRNG). The random value may be unique among the tokens that are generated.

In some embodiments, where the request is for dynamically allocating memory, obtaining the token may include determining an area of memory to allocate and a pointer to that area of memory. In this case, the token may be the logical or virtual memory address to be returned.

In some cases a previously generated token may be obtained for reuse. Although tokens may be reused, the token that is obtained should not be currently in use and in particular should not match a token that is currently associated to or otherwise corresponds to a key in a set of associated keys.

In operation 508, a reply is sent to the process or the software module executed by the process. The reply includes the token, which may include the random value or a logical address. The token may be included in another request received from the process.

In operation 510, a second request is received. The second request is received from the monitored process and may be for performing one or more operations 512, 514, 516, 518 and 520 of the method 500 of FIG. 5, which may be triggered by the request. In some embodiments, the request is received by a kernel in response to a system call invoked by the process. The request may sometimes be referred to as a request for associating a token to a key for the process.

The second request may include the token and an identifier. The identifier should match a key included in the profile and may be used to restrict permitted activities of the process and/or trigger a modification to a policy associated with the process.

In operation 512, the token is validated. Validating the token may include determining whether the token already is associated with or otherwise corresponds to a key included in the profile. A token may correspond to a key if the token can be used to lookup the key in the set of associations. For example, the allocated associations object 310 shown in the data facility 300 in FIG. 3 may be referenced to determine whether the token maps to any key in the set of keys associated with the process. If the token can be used to lookup a key, then an association of the token to the key already exists and the token is invalid for establishing new associations. In response to determining that the token corresponds to an identifier, the computing device in operation 516 takes an action.

Alternatively, if the system determines that the token does not correspond to an existing association, then the computing device may in operation 514 validate the identifier. The identifier may be mapped to a key. In some implementations, the identifier may be used as a key. In some implementations, there may exist a mapping between identifiers and keys that can be referenced to lookup a key using the identifier.

Validating the identifier may include determining whether the key is valid based on a current state associated with the process. This operation may involve determining whether a request to associate the key with the given token is permitted based on the current state and according to the profile. In other words, this operation may involve determining whether a state transition is permitted based on the key and according to the profile and current state.

Various techniques and data structures may be implemented to determine whether a transition is permitted and the key can be used to lookup a next state. For example, the state-transition table 304 shown in the data facility 300 in FIG. 3 may be referenced to determine whether a trigger event for the current state has occurred. The trigger event may be the receipt of the request including the identifier. For the identifier to be valid, the identifier should map to a key which matches a key included in a trigger event that is in the profile and is associated with the current state. For example, referring again to the example state-transition table 304 in FIG. 3, if the current state identifier is the first state "S1" and the key related to the request is the value "5", then the request matches the "Associate 5" trigger event for the first state "S1". Accordingly, the trigger event is satisfied and the key as well as the identifier is valid. Alternatively, if the key does not match the event, then no trigger event is satisfied and the key and identifier are invalid. If the system determines that the identifier is invalid based on profile and the current state, then in response in operation 516 an action is taken.

If in operation 512 or 514 the token, identifier, and/or the key is determined to be invalid, then in response and based on that determination the computing device in operation 516 takes an action. Taking an action may include raising an alert, restricting execution of the process, terminating the process, quarantining files associated with the process, quarantining the software module, recording the violation, and/or allowing the operation. Raising the alert may include transmitting the alert to a monitoring system and/or the remote server. The alert may include an indication that an exploit may have been detected and that an attacker's program may be executing on the process.

Based on the determination that validation in operation 512 and/or 514 is successful (i.e. the token and the identifier are valid), operations 518 and 520 may be triggered.

In operation 518, an association of the token to the key is established. In some cases, the token is linked or mapped to the key. This operation may involve identifying and managing a set of associations allocated to or otherwise associated with the process. The set of associations should be updated to include the new association between the key and token. If the key is not already associated with the process, then it may be added to the set. Upon adding the key to the set, an association may then be established between the token and the key.

Various techniques and data structures may be implemented to manage the set of associations associated with the process and establish an association between the token and key. In some embodiments, the set of associations is implemented as a table or two-dimensional array, where one column contains the token and the other column the corresponding identifier. The table may, for example, be stored as an allocated associations object 310 in the data facility 300 in FIG. 3. In some implementations, the number of tokens in the set of associations may range from hundreds to thousands to millions of tokens. Since a linear search may be inefficient for large numbers of tokens, the table may be indexed by token. Since the token should be unique in the table and not already exist in the table, searching for the token may be performed using a sub-linear time lookup.

The operations of adding an identifier to a set of associations associated with a process and/or establishing the association between the token and the key in the set of associations may sometimes be referred to as "associating" the identifier or key to the process.

Notably, there does not need to be a one-to-one mapping of tokens to keys. Two different tokens may map to the same key. However, in at least some cases, although a plurality of tokens may correspond to a particular key, a particular token may correspond to only one key. For example, a particular key may correspond to more than one token when operations 504, 506, 508, 510 and 518 are performed in response to the process performing a call in a loop. Each iteration of the loop may involve a call that returns a different token (e.g. a different virtual memory address) that is then linked to the same static identifier/key, which may be defined prior to the execution of the software module being monitored.

Many of the embodiments and operations described herein focus on establishing an association of the token with the key. However, it is understood that an identifier may be used as a key and, accordingly, establishing an association of the token with the key may involve establishing an association of the token with the identifier. In other words, an association of the token to data corresponding to, or otherwise associated with, the identifier may be established, wherein the data associated with the identifier may be the identifier itself or a key that the identifier may map to. The established association may be stored for use in processing a disassociation request.

In operation 520, a state associated with the process may be transitioned. Transitioning from a current state to a next state may include determining a next state based on the current state, the identifier, and the profile. The transition may involve transitioning a mode of operation of the process and a policy applied to or otherwise associated with the process. Transitioning the policy may be based on the profile and the key and may include determining a policy to be applied to the process, selecting a particular policy from a plurality of policies, replacing a current policy with the selected policy or a another policy, and/or modifying a policy currently applied to the process. In some embodiments, a state identifier for the next state can be used to lookup the policy. For example, the state object 306 shown in the data facility 300 in FIG. 3 may be referenced to identify and transition to a policy associated with the next state.

The policy may be used to verify that the process is not behaving unexpectedly, as the process should not perform an operation that is in violation of the policy. If a violation or attempted violation of the policy is detected, then an action may be taken in operation 516.

Figure 6:
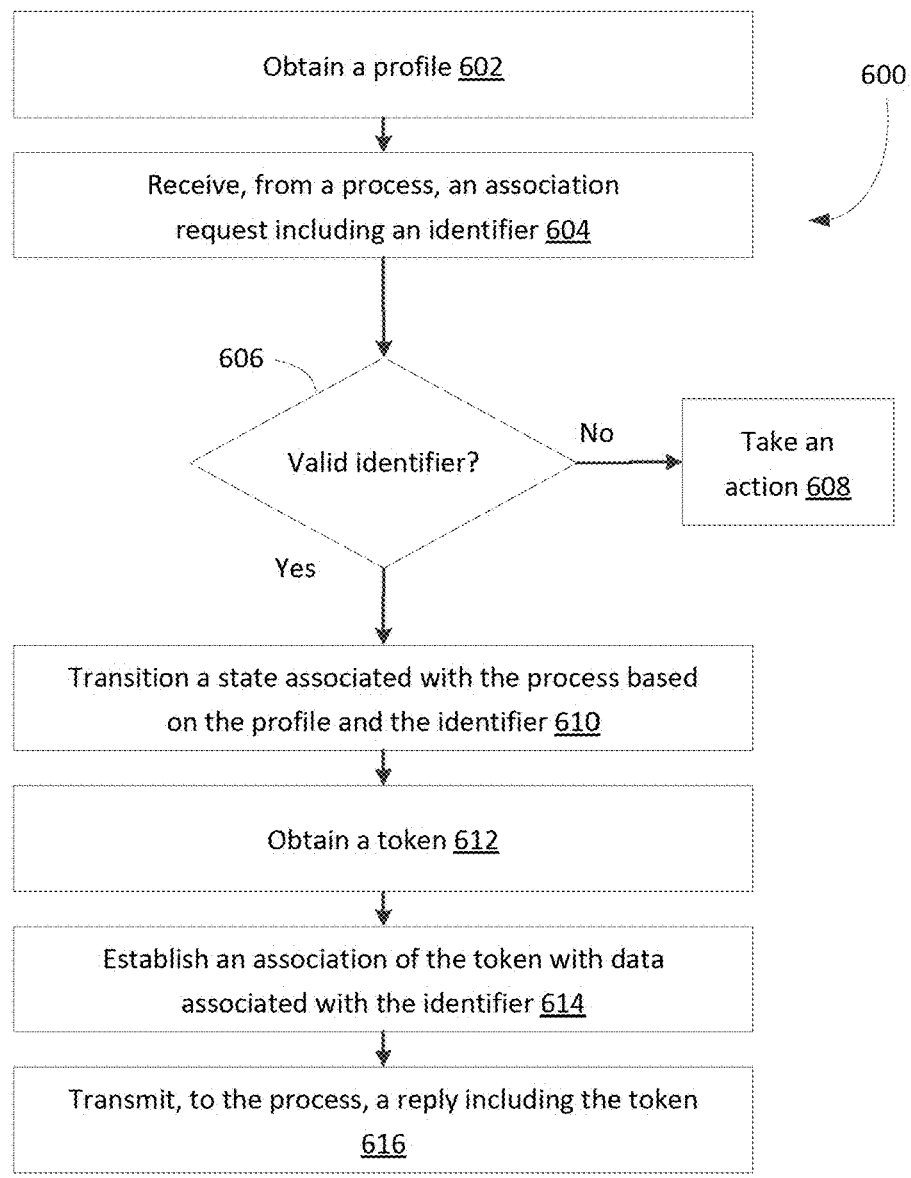
FIG. 6 shows a flowchart of another simplified example method of monitoring the behavior of a process.

Reference will now be made to FIG. 6, which shows, in flowchart form, another simplified example of a method 600 of monitoring a process during an "Associate" phase. The method 600 is a variation of the method 500 of FIG. 5 and combines the two separate requests shown in FIG. 5 into a single request. Those skilled in the art will recognize that other variations may be necessary than those shown or described in relation to the method 600 of FIG. 6.

In at least some implementations, the method 600 of FIG. 6 should be performed outside of the monitored process. For example, the operations may be performed by the kernel and/or by a separate process.

The method 600 includes an operation 602 in which a profile of a software module is obtained. The operation 602 may correspond to the operation 502 of FIG. 5 and the method 600 may continue as shown.

In operation 604, a request is received from a process corresponding to the software module. The operation 604 may be a combination of operations 504 and 510 of FIG. 5. The request may be for a token, as may be the case with the operation 504 of FIG. 5, but may also be for associating a key to the process, as may be the case with the operation 510 of FIG. 5. Accordingly, the request in operation 604 of FIG. 6 may include an identifier, but exclude a token. A token may be generated and returned instead of the token being included in the request.

In some embodiments, the request is received by a kernel in response to a system call invoked by the process. The request may sometimes be referred to as a request for associating a key to the process.

In operation 606, the identifier is validated. The operation 606 may correspond to the operation 514 of FIG. 5. If the identifier is invalid, then the computing device may in operation 608 take an action. The operation 608 may correspond to the operation 516 of FIG. 5.

Alternatively, if the identifier is valid, then in response in operation 610 a state associated with the process may be transitioned based on the profile and the identifier. The operation 610 may correspond to the operation 520 of FIG. 5 and the method 600 may continue as shown.

In operation 612, a token is obtained. The token may be a random value or a logical or virtual address that may be obtained as described in connection with the operation 504 of FIG. 5.

In operation 614, a correspondence of the token to the identifier is established. The operation 614 may correspond to the operation 518 of FIG. 5.

In operation 616, a reply is sent to the process. The reply includes the token.

Figure 7:
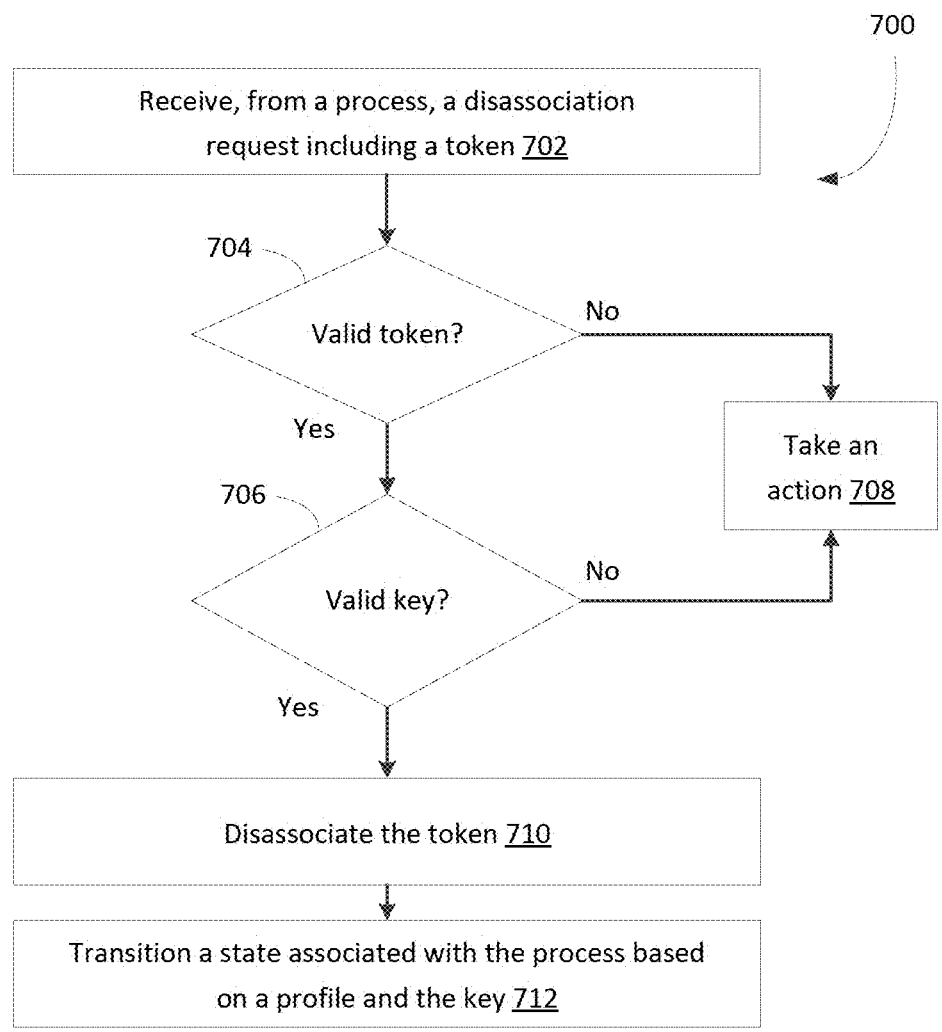
FIG. 7 shows a flowchart of yet another simplified example method of monitoring the behavior of a process.

Reference will now be made to FIG. 7, which shows, in flowchart form, a simplified example of a method 700 of monitoring a process during a "Disassociate" phase. The example method 700 may be implemented by one or more computing devices suitably programmed to carry out the functions described. In this example method 700, the computing device may be implemented by a monitoring agent in the client device 102 in the example system 100 described in FIG. 1.

The method 700 may follow one or more operations in the methods 500 and 600 of FIGS. 5 and 6. In at least some implementations, the operations of FIG. 7 that follow should be performed outside of the monitored process. For example, the operations may be performed by the kernel and/or by a separate process.

In operation 702, a request is received from the monitored process. The request may be for performing one or more operations 704, 706, 708, 710 and 712 of the method 700 of FIG. 7. In some embodiments, the request is received by a kernel in response to a system call invoked by the process. The request may sometimes be referred to as a request for disassociating a token with a key.

The request may include one or more parameters. Example parameters include the token. The request should not need to include an identifier and/or key. In other words, the request may exclude the identifier and, in particular, may exclude any identifier that that corresponds to the token. For example, the request may exclude the identifier that is included in the request in operation 510 of FIG. 5.

In response to receiving the request, one or more operations 704, 706, 708, 710 and 712 of the method 700 of FIG. 7 may be triggered.

In operation 704, the token is validated. Validating the token may include determining whether the key can be retrieved based on the token. This operation may involve determining whether the token corresponds to a key in the process' associations object 310. For example, the mapping established between the key and the token at the operation 518 of the method 500 of FIG. 5 may be referenced. If the token does not map to a key and the lookup fails, then the token is invalid. In response to determining that the token is invalid, the computing device may in operation 708 take an action. The operation 708 may correspond to the operation 516 of FIG. 5.

Alternatively, if a corresponding key is successfully retrieved based on the token, then the token is valid and the computing device may in operation 706 validate the key. Validating the key may include determining whether the key is valid based on the profile and a current state associated with the process. If the system determines that the key is invalid based on profile and the current state, then in response the computing device in operation 708 takes an action.

The retrieved key may or may not match the identifier in the operation 518 of the method 500 of FIG. 5 or the identifier in the operation 614 of the method 600 of FIG. 6. If a correspondence of the token to an identifier is established only once, then the retrieved key should match the key from the operation 518 of FIG. 5 or the operation 614 of FIG. 6. However, a token may be released from its association with a first key after which it may be reused in establishing an association of the token with a different second key. For example, if the token is a virtual memory address, the virtual memory address may be allocated to the process, mapped to a first key, released or freed from being allocated to the process with a related "Disassociate" phase, reallocated to the process and then mapped to a second key that is different from the first key. In this way, a particular token may be linked to more than one key at different times and not at the same time. In other words, a particular token may be linked to a plurality of keys, but not simultaneously.

If in operation 704 or 706 the monitoring module determines that the token and/or the key is invalid, then in response and based on that determination the computing device in operation 708 takes an action.

Based on the determination that validation in operation 704 and/or 706 is successful (i.e. the token and the key are valid), operations 710 and 712 may be triggered.

In operation 710, the association of the token to the key is ended. In other words, the token is disassociated from the data associated with the identifier. In some embodiments, this may involve reversing one or more operations carried out in operation 518 of the method 500 of FIG. 5. For example, ending the correspondence may involve removing the token from a table data structure that includes a set of keys associated with the process. This operation may also involve removing the key from the set of keys associated with the process if no other tokens correspond to the key. Ending the association of the token to the key and/or removing the key from the set of keys associated with the process may sometimes be referred to as "releasing" or "Disassociating" the key.

In operation 712, a state associated with the process may be transitioned based on the profile and the key. The operation 712 may correspond to the operation 520 of FIG. 5.

In this way, a computer system may detect an anomaly based on data representing an expected behavior. Moreover, the methods 500, 600 and 700 of FIGS. 5, 6 and 7 provide an approach for detecting an exploitation of a vulnerability in a running program. This may be particularly useful in situations where an attacker has injected shellcode to allow the attacker to interact with the target computer system. A software module provided by an attacker, running in the same address space as the vulnerable program that was attacked, should disassociate tokens in the same order as the original program and with the correct token being passed during a disassociate phase to the monitoring module and without an incorrect identifier being passed to the monitoring module by the monitored process during an associate phase. This may significantly increase the complexity of a successful attack. In addition, since the program should not need to pass the identifier to the monitoring module when performing a release operation, the process should not need to manage either a set of keys, identifiers, or information regarding the current state. This lack of information about state and associations may hinder an attacker's efforts to properly unwind the allocations.

It is understood that the requests in the methods 500, 600 and/or 700 of FIGS. 5, 6 and 7 may be received from a process executing the software module that has been profiled, but at some point in time a vulnerability may be exploited and the process may commence executing an attacker's program and, accordingly, the requests may be received from the process while executing the attacker's program rather than the original software module.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to, or based on the result of, one or more of the above-described operations.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described methods/processes may be implemented as a part of computer-executable code stored in volatile or non-volatile memory, as part of an application-specific integrated chip (ASIC), etc.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Although many of the above examples refer to a "function" call when discussing software requests, it will be appreciated that this does not necessarily restrict the present application to implementation using particular programming languages, and does not necessarily imply that the request is of a particular type or format. Requests may have different names in different software paradigms.

Certain adaptations and modifications of the described embodiments can be made. Therefore, the above discussed embodiments are considered to be illustrative and not restrictive.

What is claimed is:

1. A computer-implemented method, the method comprising:
obtaining a profile of a software module;
receiving, from a process, an association request including a first identifier;

in response to receiving the association request:
  successfully validating the first identifier based on the profile; and
  establishing an association of a first token with data associated with the first identifier;
receiving, from the process, a first disassociation request including the first token, the first token provided as a parameter included in the first disassociation request;
in response to receiving the first disassociation request:
  retrieving, based on the first token, the data associated with the first identifier;
  determining, based on the profile and the data associated with the first identifier, that the first disassociation request is invalid; and
  based on the determination that the first disassociation request is invalid, taking an action; and
in response to receiving a second disassociation request, the second disassociation request including a second token:
  retrieving, based on the second token, data associated with a second identifier;
  determining, based on the profile and the data associated with the second identifier, that the second disassociation request is valid; and
  triggering a transition from a first state to a second state.

2. The method of claim 1, wherein establishing the association of the first token with the data associated with the first identifier includes establishing an association of the first token with the first identifier.

3. The method of claim 1, wherein the first token includes a logical address.

4. The method of claim 1, wherein the profile of the software module is a profile of a script.

5. The method of claim 1, wherein the association request corresponds to a system call.

6. The method of claim 1, further comprising, in response to receiving a second association request, the second association request including the first identifier, determining that the second association request is invalid based on the first identifier and the profile.

7. The method of claim 1, further comprising, in response to the association request, transitioning, based on the profile and the first identifier, a policy applied to the process.

8. The method of claim 1, further comprising, in response to receiving a third disassociation request, the third disassociation request including a third token, determining that the third token does not correspond to any key included in the profile.

9. The method of claim 1, wherein the association request further includes the first token.

10. A system comprising:
a processor;
a memory storing processor executable instructions that, when executed by the processor, cause the processor to:
  obtain a profile of a software module;
  receive, from a process, an association request including a first identifier;
  in response to receiving the association request:
    successfully validate the first identifier based on the profile; and
    establish an association of a first token with data associated with the first identifier;
  receive, from the process, a first disassociation request including the first token, the first token provided as a parameter included in the first disassociation request;
  in response to receiving the first disassociation request:
    retrieve, based on the first token, the data associated with the first identifier;
    determine, based on the profile and the data associated with the first identifier, that the first disassociation request is invalid; and
    based on the determination that the first disassociation request is invalid, taking an action; and
  in response to receiving a second disassociation request, the second disassociation request including a second token:
    retrieve, based on the second token, data associated with a second identifier;
    determine, based on the profile and the data associated with the second identifier, that the second disassociation request is valid; and
    trigger a transition from a first state to a second state.

11. The system of claim 10, wherein establishing the association of the first token with data associated with the first identifier includes establishing an association of the first token with the first identifier.

12. The system of claim 10, wherein the first token includes a logical address.

13. The system of claim 10, wherein the profile of the software module is a profile of a script.

14. The system of claim 10, wherein the association request corresponds to a system call.

15. The system of claim 10, wherein the instructions, when executed, further cause the processor to, in response to receiving a second association request, the second association request including the first identifier, determine that the second association request is invalid based on the first identifier and the profile.

16. The system of claim 10, wherein the instructions, when executed, further cause the processor to, in response to the association request, transition, based on the profile and the first identifier, a policy applied to the process.

17. The system of claim 10, wherein the instructions, when executed, further cause the processor to, in response to receiving a third disassociation request, the third disassociation request including a third token, determine that the third token does not correspond to any key included in the profile.

18. A non-transitory computer-readable storage medium storing processor-executable instructions, wherein the processor-executable instructions, when executed by a processor, cause the processor to:
  obtain a profile of a software module;
  receive, from a process, an association request including a first identifier;
  in response to receiving the association request:
    successfully validate the first identifier based on the profile; and
    establish an association of a first token with data associated with the first identifier;
  receive, from the process, a first disassociation request including the first token, the first token provided as a parameter included in the first disassociation request;
  in response to receiving the first disassociation request:
    retrieve, based on the first token, the data associated with the first identifier;
    determine, based on the profile and the data associated with the first identifier, that the first disassociation request is invalid; and
    based on the determination that the first disassociation request is invalid, taking an action; and in response to receiving a second disassociation request, the second disassociation request including a second token:
  retrieve, based on the second token, data associated with a second identifier;
  determine, based on the profile and the data associated with the second identifier, that the second disassociation request is valid; and
  trigger a transition from a first state to a second state.

* * * * *